Nov. 12, 1968  W. FRIEDL  3,411,106
MERCURY-KRYPTON LASER
Filed March 18, 1963  4 Sheets-Sheet 3

FIG. 2

| Krypton Energy Levels | $1s_5 (5\,^3P_2)$: METASTABLE | | | | | $1s_4 (5\,^3P_1)$ | | | |
|---|---|---|---|---|---|---|---|---|---|
| Mercury Starting Energy Levels | $9\,^1P_1$ | $9\,^3P_2$ | $9\,^3P_1$ | $9\,^3P_0$ | | $10\,^3P_2$ | $10\,^3P_1$ | $10\,^3P_0$ | |
| | λ [Å] / End Level | λ [Å] / End Level | λ [Å] / End Level | λ [Å] / End Level | | λ [Å] / End Level | λ [Å] / End Level | λ [Å] / End Level | |
| Visible Spectral Range | 6234 / $7\,^3S_0$ <br> 5676 / $7\,^3S_1$ | 5872 | 5859 | 5807 / $7\,^3S_1$ | | 5354 | 5385 | 5389 / $7\,^3S_1$ | |

| Mercury Starting Energy Levels | $10\,^1S_0$ | $10\,^3S_1$ | $8\,^1D_2$ | $8\,^3D_{3,2,1}$ | | $11\,^3S_1$ | $9\,^1D_2$ | $9\,^3D_{3,2,1}$ | $10\,^3D_{3,2,1}$ |
| | λ [Å] / End Level | λ [Å] / End Level | λ [Å] / End Level | λ [Å] / End Level | | λ [Å] / End Level | λ [Å] / End Level | λ [Å] / End Level | λ [Å] / End Level |
| Ultraviolet Spectral Range | 3802 / $6\,^1P_1$ | 2760 / $6\,^3P_2$ <br> 2447 / $6\,^3P_1$ | 3906 / $6\,^1P_1$ | 2805 / $6\,^3P_2$ <br> 2483 / $6\,^3P_1$ | | 2675 / $6\,^3P_2$ <br> 2474 / $6\,^3P_1$ | 3704 / $6\,^1P_1$ | 2699 / $6\,^3P_2$ <br> 2400 / $6\,^3P_1$ | 2640 / $6\,^3P_2$ |

INVENTOR.
Wolfgang Friedl
BY Michael S. Striker
Attorney

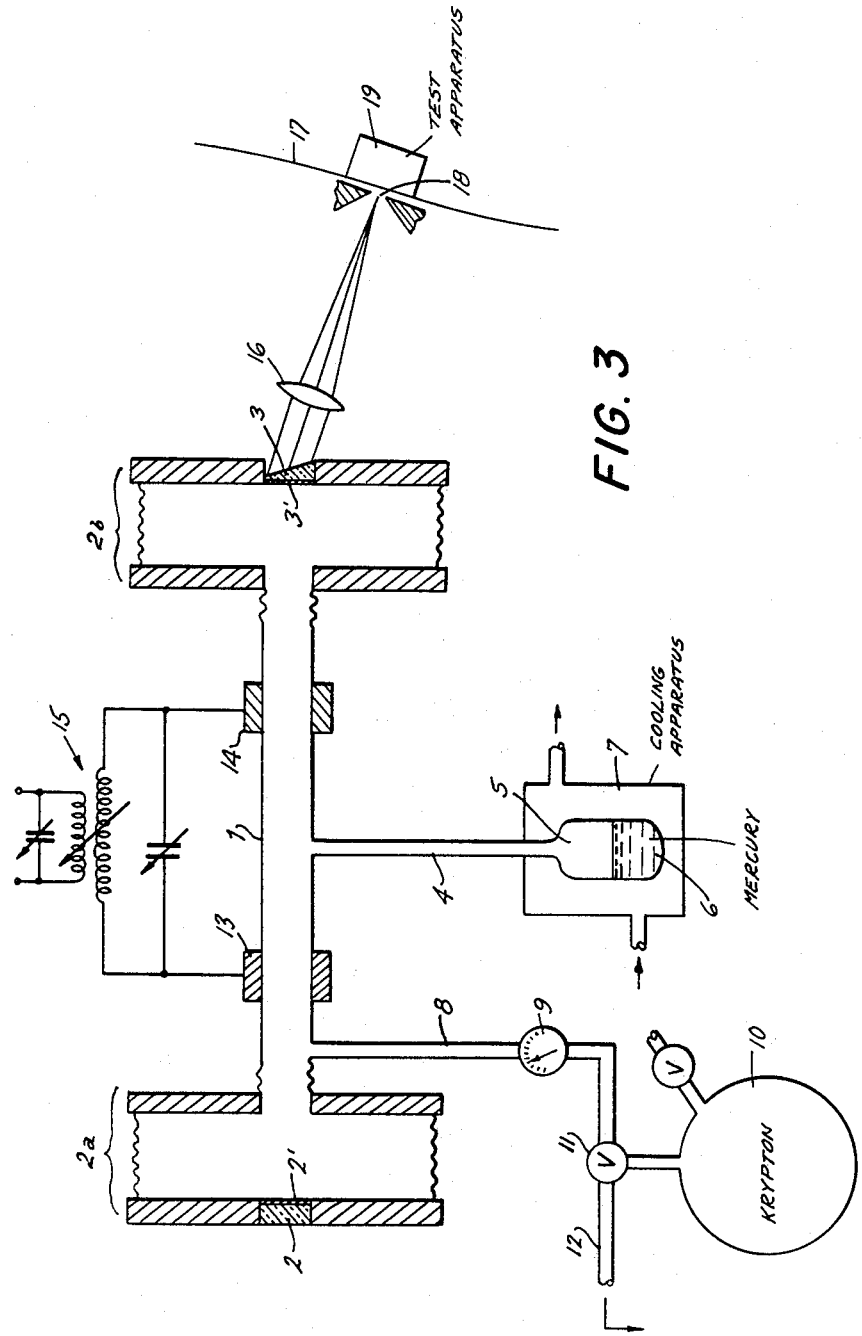

United States Patent Office 3,411,106
Patented Nov. 12, 1968

3,411,106
MERCURY-KRYPTON LASER
Wolfgang Friedl, Hanau am Main, Germany, assignor to Quarzlampen Gesellschaft m.b.H., Hanau am Main, Germany
Filed Mar. 18, 1963, Ser. No. 265,953
Claims priority, application Germany, Mar. 19, 1962, Q 703
4 Claims. (Cl. 331—94.5)

The present invention concerns a quantum-mechanical oscillator for producing coherent radiation in a frequency range including visible and ultraviolet light.

Quantum-mechanical oscillators or amplifiers, sometimes also called "Quasers," are devices which make it possible to produce an oriented pencil of rays with an extremely high intensity (electromagnetic energy density) which could not be produced up to now. The operation of these devices is based on the fact that in atoms, molecules or solid bodies (crystals) certain energy levels defined by specific conditions of activation are populated to a greater degree than other levels of lesser energy (inversion population) so that at a given moment emission transfer takes place from a level of higher energy to a level or several levels of lesser energy while at the same time radiation is emitted. This takes place in such a manner that such spontaneous emission transfers initiate by their electromagnetic field so-called induced emission transfers which are more frequent than the corresponding absorption transfers. The radiation released in this procedure is substantially coherent. By certain means it is possible to arrange matters so that the majority of the induced radiation is emitted in a particular predetermined and preferred direction. In this manner a narrow beam of rays with extremely high energy density of the electromagnetic field is obtained resulting in correspondingly high intensities of irradiation of any object or surface upon which such a beam of ray impinges.

Quantum-mechanical oscillators or amplifiers for wave lengths in the visible portion of the spectrum have been given the name "Laser" (light amplification by stimulated emission of radiation). Crystal-lasers or solid body lasers have certain disadvantages, such as excessive heating preventing continuous operation, inhomogeneity of crystals, inefficiency, and band-spread.

Quantum-mechanical oscillators or amplifiers are known which operate with a gas mixture of helium and neon. The gas mixture consists predominantly of helium atoms; the neon atoms are present in a much weaker concentration. Under conditions well known for electrical gas discharges, neutral helium atoms present in a helium-neon gas mixture are so activated that by secondary collisions of the neon atoms with helium atoms excited to an upper metastable state, energy is transferred preferentially to the upper metastable energy level of the neon atoms, and the neon atoms can be stimulated to emit radiation in the near infrared region.

It is an object of this invention to provide a quantum-mechanical oscillator producing coherent radiation in a frequency range including visible and ultraviolet light.

It is a further object of this invention to provide a quantum mechanical oscillator which makes it possible to select or to emphasize certain lines or fractions of the spectrum of the emission.

With above objects in view the invention includes a quantum-mechanical oscillator for producing an oriented beam of coherent radiation in a frequency range including visible and ultraviolet light, comprising, in combination, a tubular gas discharge chamber means; first and second reflector means located at the opposite ends of said tubular gas discharge chamber means for reflecting between themselves in axial direction of said chamber means radiation produced therein, the first reflector means at one of said ends causing total reflection, the second reflector means at the opposite end causing only partial reflection and permitting emission of coherent radiation therethrough in said axial direction; a gaseous filling arranged in said tubular gas discharge chamber means and comprising a mixture of krypton gas and mercury vapor; means for creating a predetermined partial pressure in said krypton gas and a predetermined partial pressure in said mercury vapor in said chamber means; and high-frequency generator means including electrode means assembled with said tubular gas discharge chamber means for producing in said gaseous filling therein high-frequency gas discharges resulting in said radiation, the spectral range thereof depending upon said partial pressure of said krypton gas.

An oscillator according to the invention produces an oriented pencil of rays which contains under conditions well known for electrical gas discharges predominantly certain spectral lines in the visible and ultraviolet range of the spectrum. Consequently, the new oscillator according to the invention is most useful in many fields of which the following may be mentioned: Initiation of photo-chemical reactions for the purposes of biological, botanical and chemical research, industrial utilization of such reactions for producing chemical compounds, exploration and utilization of selective photo-chemical reactions which are highly dependent on wave lengths. In these fields under certain conditions the oscillator may be used alone or in combination with suitable devices for spectrally analyzing the radiation emitted in a preferred direction.

It is to be stressed that it is an entirely new discovery that a gas mixture of krypton and mercury is extremely well suited for the operation of a quantum-mechanical oscillator which is intended to produce an emission of radiation in the frequency range including visible and ultraviolet light, i.e. in a device which may be properly called a laser or also an UV-aser.

In many cases it is advisable to arrange the quantum-mechanical oscillator according to the invention in series with a device which favors the passage of a predetermined or selected fractional range of the delivered spectrum. Devices of this kind may be special filter systems, but preferably so-called monochromators should be used because in view of the enormous emission intensity of a quantum-mechanical oscillator the relatively low output efficiency of a monochromator has practically no significance. Details of such an arrangement will be described further below.

Before proceeding it should be understood that here below the abbreviation AU designating wave lengths intends to represent Angstrom Units and that the different terms of the atoms are designated in two ways, first in accordance with the so-called Paschen-Symbols, and thereafter in accordance with the so-called Russel-Saunders Symbols. Finally the gas pressure will be given in terms of torrs wherein one torr is equal to the pressure of 1 mm. mercury column at 0° C.

There are other possibilities of raising the relative intensity of a specifically selected spectral line in the direction of the emission. If for instance the mercury lines 6234 and 5676 AU are of interest then it is necessary to see to it that the metastable level or term $1s_5$ ($5^3P_2$) of the neutral krypton atom is preferably occupied and that it is not substantially emptied by collisions with the walls of the gas discharge chamber. Under these conditions also the occupation of the mercury level, or term $9^1P_1$ which is the controlling one for the emission of the above mentioned mercury lines, is particularly favored namely by collisions of the second type with krypton atoms in this metastable term or condition. A particularly simple way to meet these conditions is to keep the partial pressure in the krypton gas at about $5 \times 10^{-2}$ torr while keeping the diameter of the gas discharge tube or chamber as large as possible i.e. as large as would be compatible with the practical size and capacity of the pertaining high frequency generator.

In order to avoid a misunderstanding the expression "collisions of the second type" will be explained. In the case of a collision of the first type the kinetic energy of the active part is converted into potential energy in the inactive part. However, in the case of a collision of the second type the potential energy of one of the colliding parts is converted into potential energy of the other colliding part.

If high intensity of the mercury line 5385 AU is desired then the term $1s_4$ ($5^3P_1$) of the neutral krypton atom is to be preferably occupied. In this case the mercury term $10^3P_1$ which is the controlling one for the emission of this particular line is to be preferentially occupied by collisions of the second type. A preferred occupation of this term is obtained in the simplest manner if the partial pressure in the krypton gas is kept at about $2 \times 10^{-2}$ torr. If it is desired to simultaneously weaken the intensity of the mercury lines 6234 and 5676 AU then it is advisable to select a diameter of the discharge chamber which is somewhat smaller than in the above-described case. On the basis of similar considerations it is also possible to increases or decrease the relative intensity of certain selected spectral lines in the ultraviolet range of the spectrum, as will be explained further below.

Further possibilities of preferentially or selectively occupying a desired term of the krypton atom is the change of the field strength in the gas discharge chamber i.e. a change of the voltage applied to the chamber or of the distance between the electrodes, or also a change in the dimensions of the chamber etc. the important point is to give the electron speed, i.e. the electron temperature, such a value that the particular term of the krypton atom is relatively more intensely occupied which by collisions of the second type between krypton and mercury atoms leads to the emission of the desired spectral lines. At the same time one has to arrange matters so that the particular term is not emptied by concurring processes e.g. by collisions with the walls of the chamber, which do not lead to the occupation of the desired mercury terms. Finally it also must be seen to it that the respective mercury terms are predominantly emptied only by emission transfer and as far as possible not by other processes. The effect of the influence of such other processes would be that the amplification effect depends not directly upon the existing pressure but it would generally pass through a maximum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a chart showing those wave lengths of mercury lines the radiation of which can be produced in the visible and/or ultraviolet range of the spectrum in the case of preferential occupation of the $1s_4$ ($5^3P_1$) and/or the $1s_5$ ($5^3P_2$) level of the krypton atom; and FIG. 3 is a diagrammatic illustration of a quantum-mechanical oscillator according to the invention combined with means acting as monochromator.

Figure 1A:
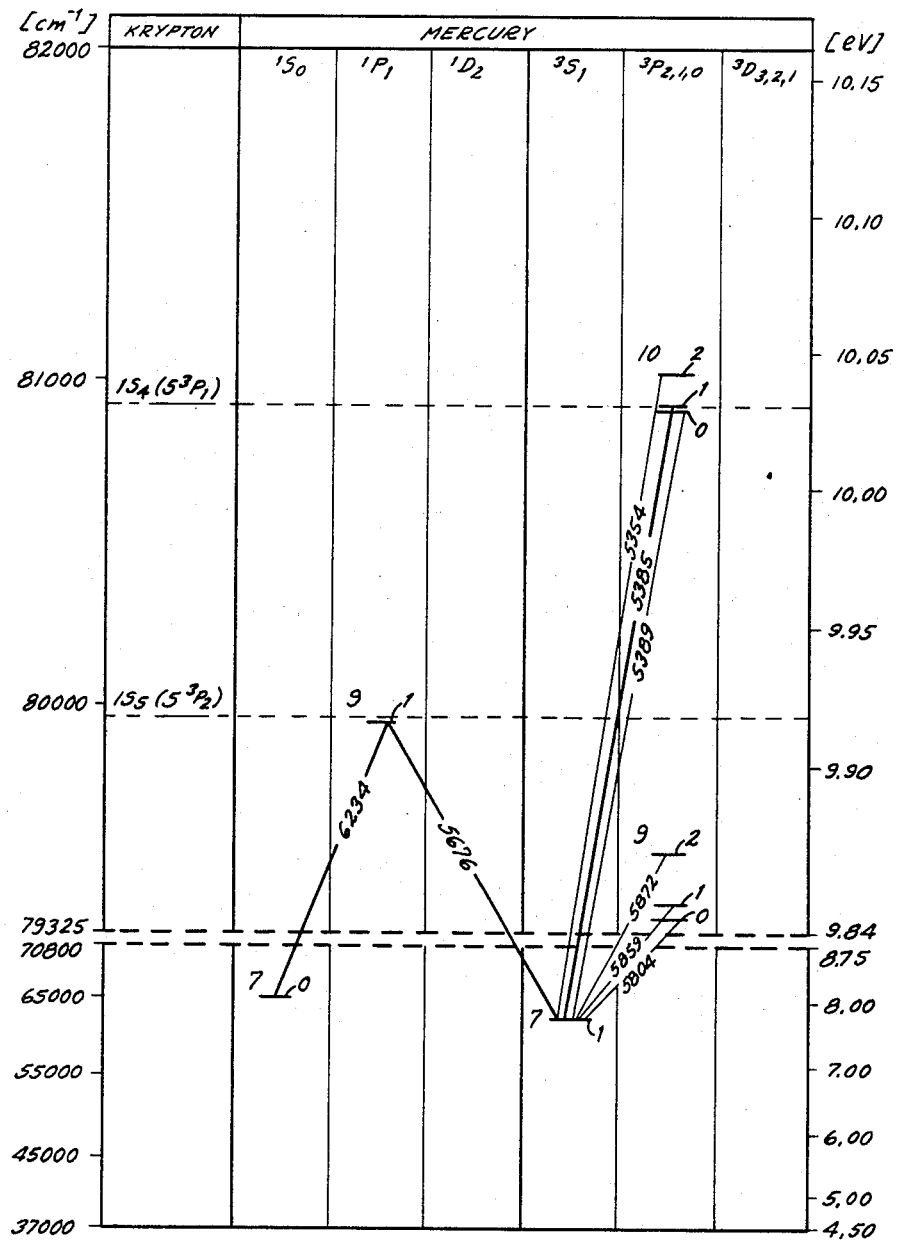
FIG. 1a is a diagram illustrating the relations between various terms of krypton and mercury atoms which can be utilized according to the present invention for producing visible light.
Figure 1B:
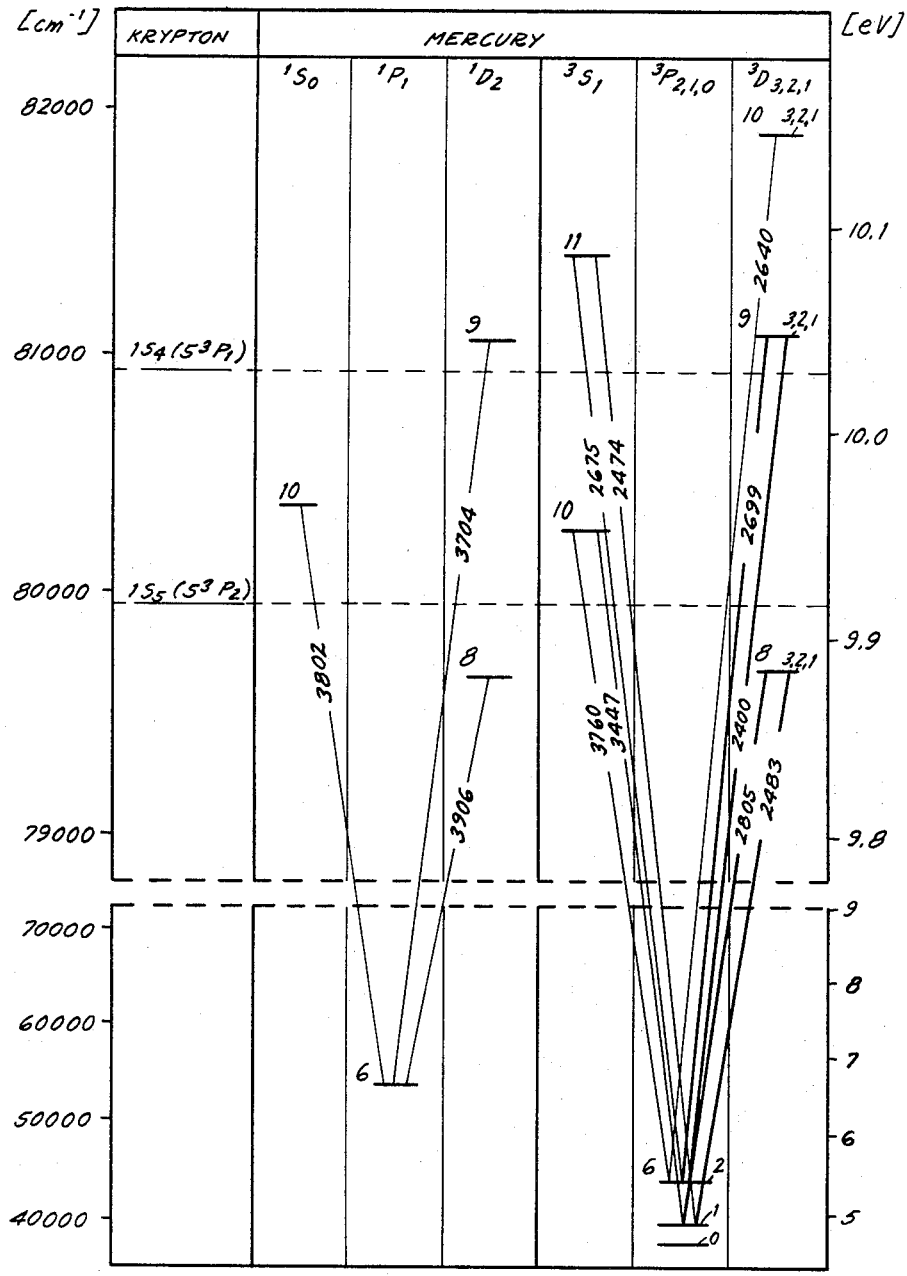
FIG. 1b is a similar diagram illustrating those relations which can be utilized according to the invention for producing ultraviolet radiation.

In FIGS. 1a and 1b the energy levels of significance for the present invention are indicated in juxtaposition both for the neutral krypton atom and for the neutral mercury atom. As mentioned above the krypton terms are designated by means of so-called Paschen Symbols, with the corresponding Russel-Saunders Symbols added in parentheses. Upon occurrence of the above defined collisions of the second type an energy exchange takes place between an excited krypton atom and a mercury atom in its normal state in such a manner that in the case of the mercury atom a term is occupied to which approximately the same amount of energy is assigned as to the respective krypton term. Thus it is for instance possible to occupy preferentially the mercury terms $9^1D_2$, $11^3S_1$, $10^3P_{2,1,0}$ and $9^3D_{3,2,1}$ by means of the krypton term $1s_4$ ($5^3P_1$), and to occupy preferentially the mercury terms $10^1S_0$, $9^1P_1$, $8^1D_2$, $10^3S_1$, $9^3P_{2,1,0}$ and $8^3D_{3,2,1}$ by means of the krypton term $1s_5$ ($5^3P_2$). In this manner it is possible to produce the so-called "inversion population" of these hydrogen terms in relation to certain hydrogen terms of lesser energy. Under these conditions the permitted emission transfers between the various above-mentioned mercury terms of higher energy and the various hydrogen terms of lesser energy take place with the result that radiation is emitted. As is well known, the wave length of the emitted radiation is inversely proportional to the difference between the energies of the respective two terms or energy levels. The permitted emission transfers are indicated in FIGS. 1a and 1b as connecting lines between the respective terms, the applicable wave length of the emitted radiation or spectral line being marked along the respective connecting line. The connecting lines drawn boldly are those which are particularly rich in energy. For instance it can be seen that the above-mentioned mercury lines of 6234 and 5676 AU start from the term $9^1P_1$ and end at the terms $7^1S_0$ and $7^3S_1$, respectively. The mercury line 5385 is produced by the emission transfer between the terms $10^3P_1$ and $7^3S_1$. On the other hand, a definite ultraviolet line of 3802 AU is produced for instance by emission transfer from the term $10^1S_0$ to the term $6^1P_1$.

Since a collision of the second type is generally the more likely the smaller is the energy difference between the respective two levels of excitation, in the present case between a particular krypton term and the respective mercury term, usually that one of the mercury lines has the greatest intensity whose starting term is located at about the same energy level as the krypton terms $1s_4$ ($5^3P_1$) and $1s_5$ ($5^3P_2$).

For the sake of a better presentation the diagram according to FIG. 1a illustrates only the emission transfers resulting in visible light while the diagram of FIG. 1b illustrates only the emission transfers resulting in ultraviolet radiation. However, a complete list of the wave lengths which can be produced is contained in FIG. 2.

FIG. 3 is a diagrammatic illustration of a quantum-mechanical oscillator according to the invention combined with monochromator means. The oscillator essentially comprises a tubular gas discharge chamber consisting of a tube 1 made e.g. of molten quartz having a diameter of about 3–6 cm. In axial direction the tube 1 is terminated at one end thereof by an optical plate 2 coated with a totally reflecting mirror layer 2', and the other end of the tube 1 is similarly terminated by an optical member 3 coated with an only partly reflecting layer 3' so that radiation produced in the tube 1 in axial direction and reflected between the mirror layers 2' and 3' is permitted to be emitted through the mirror layer 3' and through the optical member 3. The two reflecting devices 2 and 3 are held in adjustable support arrangements comprising bellows or the like 2a and 2b, respectively, whereby the reflecting layers 2' and 3' can be adjusted relatively to each other in such a manner that they are absolutely parallel with each other. From the central portion of the tube 1 a duct 4 leads to a chamber 5. This chamber contains about 50 grams of mercury 6 of greatest purity which is kept at a temperature of about 20° C. by means of a thermostatically controlled cooling apparatus 7 of conventional design. In this manner one obtains during the operation of the discharge chamber a mercury vapor pressure therein which amounts to $1.3 \times 10^{-3}$ torr as long as nowhere in the system a temperature below 20° C. exists. Additionally, the tube 1 is filled via a duct 8 including a pressure gauge 9 with spectrally pure krypton gas from a storage container 10 until the partial pressure of this gas is generally of the order of $10^{-2}$ torr. If required or desired the gas may be additionally cleaned by electrophoresis. By means of a three-way valve 11 a high vacuum pump (not shown) may be connected to the arrangement by means of the duct 12. Before filling the chamber 5 with mercury and before filling the chamber with krypton gas the entire system must be carefully degassed e.g. by heating and by preliminary discharges with pure krypton.

For producing an electrical field inside the tube 1 i.e. the gas discharge chamber two outside electrodes 13 and 14 are applied to the tube 1. It is permissible to place between the wall of the quartz tube 1 and the electrodes an intermediate layer e.g. a foil of asbestos. The electrodes 13 and 14 may be made suitably of thin metal foils which are mounted on the tube 1 in the form of sleeves. The axial or longitudinal distance between the electrodes 13 and 14 may be approximately the length of the tube 1 but may be varied. A conventional high frequency generator 15 is connected in circuit with the electrodes 13 and 14 and should be capable of producing, as may be required, oscillations at a frequency between 20 and 50 megacycles and with a high frequency voltage of about 200 to 600 volts. In this manner a capacitive high frequency gas discharge will be produced within the tube 1 in a well known manner.

It is important to prevent during operation any contamination of the krypton-mecury gas mixture by other gases, particularly by molecular gases, as well as a decrease of the partial pressure of the krypton gas due to gas consumption. This can be done for instance by refilling the chamber from the storage container 10.

Electrons caused by the high frequency discharge within the discharge chamber to move in all directions therein excise or stimulate the krypton atoms. The terms or levels of the krypton atom occupied as a result of this stimulation are discharged or emptied again partly by spontaneous emission transfers. However, to the extent that these terms are metastable (or in the case of certain other terms immediately after their occupation) a discharge takes place predominantly by other types of elementary processes namely by collisions of the second type with mercury atoms or by collisions with the walls of the chamber. The thus selectively occupied terms of the neutral mercury atom emit first spontaneously without any preference for a particular direction of radiation emission. However, those radiation quantums which are emitted in the axial direction of the tube 1 are partly reflected repeatedly at the reflecting layers 2' and 3' of the optical members 2 and 3, respectively, whereby other mercury atoms are induced to emit radiation quantums of the same frequency and in the same direction and in phase with the exciting frequency. In this manner the intensity of the radiation is greatly increased in this particular preferred and predetermined axial direction so that the emitted coherent radiation tends to leave the chamber 1 in said axial direction. Thus a high intensity pencil of rays of a particular frequency or group of frequencies will be emitted through the partially reflecting layer 3' in axial direction if the optical member 3 is a plate similar to the plate 2. If the member 3 has prismatic shape as illustrated a modification of this radiation takes place as will be described further below.

It has been found that if the partial pressure of the krypton gas in the tube 1 amounts to about $5 \times 10^{-2}$ torr the electrons of the high frequency discharge assume a velocity of such magnitude that predominantly the metastable excitation level or term $1s_5$ ($5^3P_2$) of the neutral krypton atom is occupied which leads by means of collisions of the second type to a preferential occupation of the mercury term $9^1P_1$ which, in turn, leads to the radiation emission of the mercury lines 6234 and 5676 AU, respectively.

On the other hand by reducing the partial pressure of the krypton gas to about $2 \times 10^{-2}$ torr the electron temperature in the high frequency discharge is so increased that the excitation level or term $1s_4$ ($5^3P_1$) of the neutral krypton atom is occupied to a greater degree, this latter term representing a level of higher energy. Starting from this term of higher energy the mercury term $10^3P_1$ is preferentially occupied by collisions of the second type.

The above explanations mainly concern the operation of a quantum-mechanical oscillator for producing wavelengths of visible light according to the diagram of FIG. 1a. However, analogous phenomena take place also if the oscillator is used for producing ultraviolet radiation. As a matter of fact, FIG. 1b which may be considered a continuation of FIG. 1a indicates the corresponding terms of the mercury atom and the spectral lines produced thereby in the ultraviolet range. In the same manner as explained above the two krypton terms $1s_4$ and $1s_5$, respectively, are occupied to a different degree depending upon prevailing conditions. In order to determine the effect of the variations of these terms on the various wave lengths in the ultraviolet range it is necessary to take into consideration those mercury terms which are substantially adjacent to the respective krypton terms. As a matter of fact, it will be generally the rule that in the case of a preferential activation of one of the two above-mentioned krypton terms visible as well as ultraviolet radiation will become available for the above-described effect of amplification and of producing a coherent pencil of radiation. If a separation of visible radiation from ultraviolet radiation is desired then this can be accomplished for instance by combining with the actual oscillator monochromator means.

Monochromators are well known to the art and usually comprise an input section which effects a parallel orientation of the input rays, particularly a collimator (an input slot in combination with a concentrating lens or a concave mirror). However, since the bundle or pencil of rays entering or passing through the optical member 3 of the oscillator is already composed of parallel rays across its entire diameter a substantial simplification of the arrangement is obtained if the entire input section of the monochromator is omitted and only the remaining parts of the monochromator are aligned with the optical member 3.

In this case the remaining portions of the monochromator would essentially comprise only a prism and a focusing arrangement. Therefore a still greater simplification of the arrangement can be obtained if the optical member 3, as illustrated in FIG. 3, is itself constructed as a prism with a partly reflecting layer 3' at its inner side or face.

In this manner it is possible to select from the entire radiation output of the oscillator a predetermined fractional range of wave lengths either in the visible or in the ultraviolet portion of the spectrum while eliminating the undesired wavelengths which are simultaneously emitted but which might interfere with the particular purpose of the operation.

If, as illustrated, the optical member 3 is not a flat plate but a prism as illustrated, then the radiation of high intensity passing through the prism 3 is spectrally analzed so that a selected and predetermined wavelength can be collected with a single telescope lens 16 on the focal curve 17 and caused to pass through a slot 18. Any desired type of a test apparatus 19 may be arranged immediately beyond the slot 18. By choosing the above-described arrangement not only all parts otherwise required in a monochromator for producing parallel rays in front of the prism are saved, but also the advantage is obtained that the entire arrangement requires considerably less length.

Another possibility for selecting a desired fraction of the radiation and for eliminating or suppressing an undesired fraction of the radiation would consist in controlling the production of the reflecting surfaces of the optical members 2 and 3 in accordance with the teaching of Fabry-Perot in such a manner that the reflecting layers produce for a particular selected radiation a maximum reflection and a minimum absorption. Mirror plates of this type have been described for instance in "Electronics," volume 35, No. 1 of Jan. 5, 1962, pages 108–110.

It will be understood that each of the elements described above, or two or more together, may also find a useful application in other types of a method and oscillator arrangement for producing coherent radiation differing from the types described above.

While the invention has been illustrated and described as embodied in a method and oscillator arrangement for producing coherent radiation in a frequency range including visible and ultraviolet light, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Quantum-mechanical oscillator for producing an oriented beam of coherent radiation in a frequency range including visible and ultraviolet light, comprising
a tubular gas discharge chamber; first and second reflectors located at the opposite ends of said tubular gas discharge chamber for reflecting between themselves in axial direction of said chamber radiation produced therein, the first reflector at one of said ends causing total reflection, the second reflector at the opposite end causing only partial reflection and permitting an output of said coherent radiation therethrough in said axial direction; a gaseous filling within said tubular gas discharge chamber comprising a mixture of krypton gas and mercury vapor, means for creating a predetermined partial pressure in said krypton gas in the order of $5 \times 10^{-2}$ torr, the preferred population of the krypton being in the $1s_5$ ($5^3P_2$) krypton level, and a predetermined partial pressure of said mercury vapor in said chamber of the order of about $1.3 \times 10^{-3}$ torr; and high frequency generator means including electrodes assembled with said tubular gas discharge chamber for producing in said gaseous filling therein high-frequency gas discharges resulting in said radiation, the spectral range thereof depending upon said partial pressure in said krypton gas.

2. Quantum-mechanical oscillator for producing an oriented beam of coherent radiation in a frequency range including visible and ultraviolet light, comprising
a tubular gas discharge chamber; first and second reflectors located at the opposite ends of said tubular gas discharge chamber for reflecting between themselves in axial direction of said chamber radiation produced therein, the first reflector at one of said ends causing total reflection, the second reflector at the opposite end causing only partial reflection and permitting an output of said coherent radiation therethrough in said axial direction; a gaseous filling within said tubular gas discharge chamber comprising a mixture of krypton gas and mercury vapor, means for creating a predetermined partial pressure in said krypton gas in the order of $2 \times 10^{-2}$ torr, the preferred population of the krypton being in the $1s_4$ ($5^3P_1$) krypton level, and a predetermined partial pressure of said mercury vapor in said chamber of the order of about $1.3 \times 10^{-3}$ torr; and high frequency generator means including electrodes assembled with said tubular gas discharge chamber for producing in said gaseous filling therein high-frequency gas discharge resulting in said radiation, the spectral range thereof depending upon said partial pressure in said krypton gas.

3. Mercury-krypton gas laser utilizing a mixture of krypton gas and mercury vapor as the radiation emitting medium, having means confining said mixture and means producing a high frequency discharge in said mixture to stimulate said mixture to emit radiation,
wherein the partial pressure of the krypton is in the order of $2 \times 10^{-2}$ torr; the preferred population of the krypton is in the $1s_4$ ($5^3P_4$) krypton level; and the partial pressure of the mercury is in the order of about $1.3 \times 10^{-3}$ torr.

4. Mercury-krypton gas laser utilizing a mixture of krypton gas and mercury vapor as the radiation emitting medium, having means confining said mixture and means producing a high frequency discharge in said mixture to stimulate said mixture to emit radiation;
wherein the partial pressure of the krypton is in the order of $5 \times 10^{-2}$ torr; the preferred population of the krypton is in the $1s_5$($5^3P_2$) krypton-level; and the partial pressure of the mercury is in the order of about $1.3 \times 10^{-3}$ torr.

References Cited

UNITED STATES PATENTS 3,144,617  8/1964  Kogelnik et al. _____ 331—94.5

FOREIGN PATENTS 608,711  3/1962  Belgium.

OTHER REFERENCES

Bloom: "Observation of New Visible Gas Laser Transitions by Removal of Dominance," Applied Physics Letters, vol. 2, No. 5, pp. 101–102, March 1, 1963.

Electronics, vol. 33, October 27, 1961, p. 47.

Patel: "Optical Power Output in He-Ne and Pure Ne Maser," J. of Applied Physics, vol. 33, No. 11 pp. 3194–3195, November 1962.

JEWELL H. PEDERSEN, *Primary Examiner.*

E. S. BAUER, *Assistant Examiner.*